Figure 1:
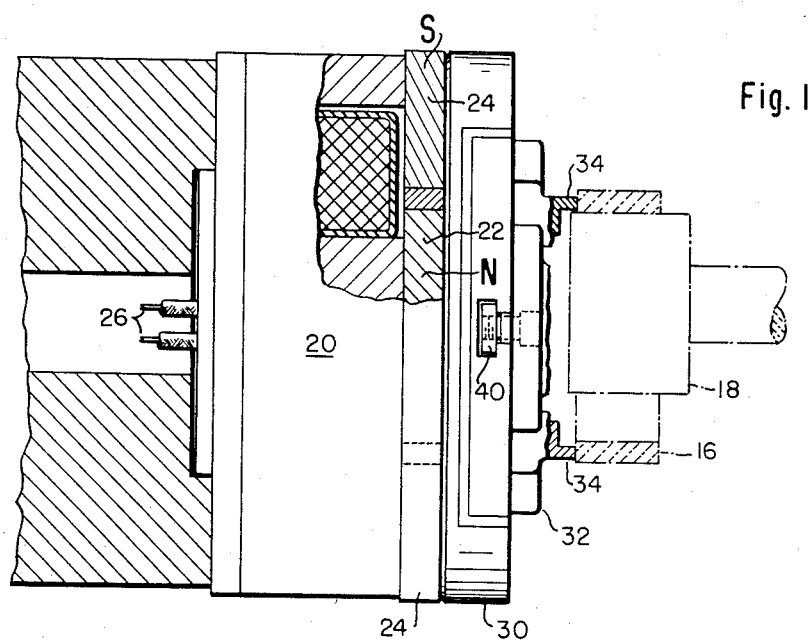

April 21, 1959

D. F. GOTHA 2,883,197

MAGNETIC DRIVER FOR ANNULAR WORK

Filed Nov. 7, 1957

2 Sheets-Sheet 1

INVENTOR.
DANIEL F. GOTHA
BY KENWAY, JENNEY, WITTER & HILDRETH

ATTORNEYS

April 21, 1959    D. F. GOTHA    2,883,197
MAGNETIC DRIVER FOR ANNULAR WORK
Filed Nov. 7, 1957    2 Sheets-Sheet 2

*INVENTOR*
DANIEL F. GOTHA
BY KENWAY, JENNEY, WITTER & HILDRETH

ATTORNEYS ered shoulder having a radius of the order of 1 inch may be mounted on the chuck in place of elements having shoulders with a radius of the order of 2 inches, etc. Preferably the inner and outer radii of the elements for a range of sizes are concentric so that the flux-conductive portions of the adapter plate will be in proper registry with jaws of various sizes.

2,883,197

MAGNETIC DRIVER FOR ANNULAR WORK

Daniel F. Gotha, Shrewsbury, Mass., assignor to O. S. Walker Company, Inc., Worcester, Mass., a corporation of Massachusetts Application November 7, 1957, Serial No. 694,953

3 Claims. (Cl. 279—1)

The present invention relates to magnetic work supports and more particularly to supporting and driving means for thin-walled annular work pieces, such as ball bearing races and the like, during grinding.

In the manufacture of ball bearings, it is common to grind the inner and outer races by centerless grinding techniques in which the work is held on the side face of a magnetic chuck which is generally of the electromagnetic type. In such operation, it is considered preferable to support the work with its center slightly displaced from the center of rotation of the chuck, such displacement being accomplished by shoes that bear against the rotating race.

By reason of such eccentric support, the bearing race is constantly moving over the surface of the support, with consequent tendency to wear the chuck face. It is therefore desirable to provide replaceable supporting elements in order that the work engaging faces may be kept true. To minimize the grooving action of the race on the supporting surfaces, it is advantageous to make the supporting surfaces narrower than the rim thickness of the race so that the sliding action takes place over the entire face of the supporting surface, rather than over only a portion thereof.

While such desirable arrangement may readily be provided for a single diameter of work piece, it is difficult to provide the desired relationship for a variety of sizes of work. It is hardly practical to provide a number of different magnetic chucks with work faces having narrow work supporting shoulders of various diameters for each size of bearing race to be ground.

It is therefore an object of the invention to provide a magnetic driver and work support for the centerless grinding of ball bearing races and other forms of annular work, adapted for use with conventional magnetic chucks having inner and outer concentric poles, wherein the work supporting elements may be adjusted for optimum relation of their supporting surfaces to the particular work piece so as to accommodate a wide range of work diameters.

In accordance with this object, the invention involves the provision of a combined magnetic adapter plate and adjustable and replaceable work-engaging elements adapted to be secured thereto, said elements being in the magnetic circuit independently of their position on the adapter plate so as to provide effective support for and driving engagement with the work piece for a wide range of sizes of work.

In the drawings illustrating the invention according to a preferred embodiment thereof, Fig. 1 is a view in side elevation, partly broken away, showing the magnetic driver mounted on an electromagnetic chuck of typical configuration and with a work piece and abrasive wheel shown in dot and dash outline.

Figure 2:
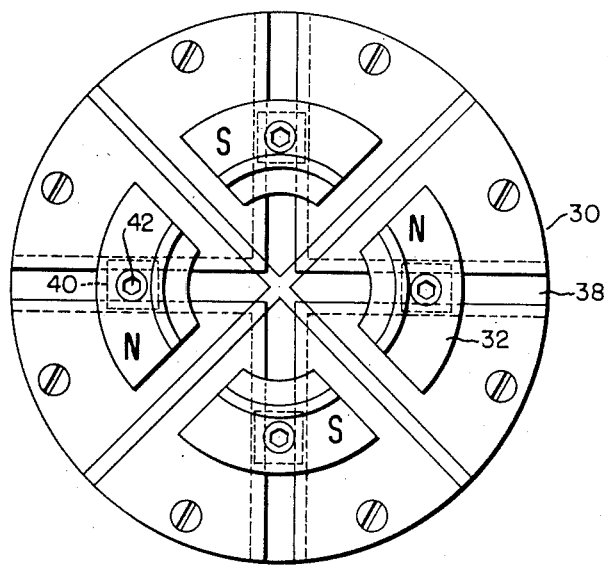
Figure 3:
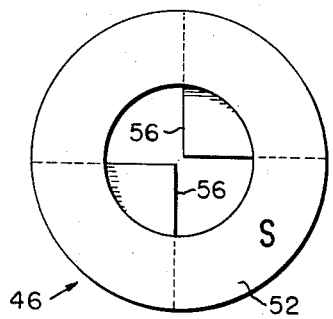
Figure 4:
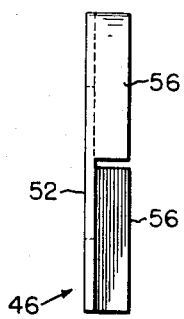
Figure 5:
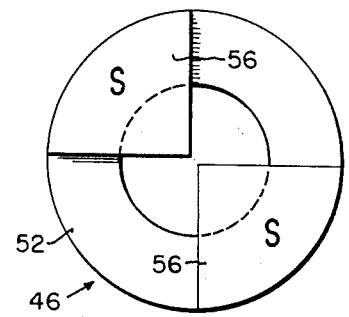
Figure 6:
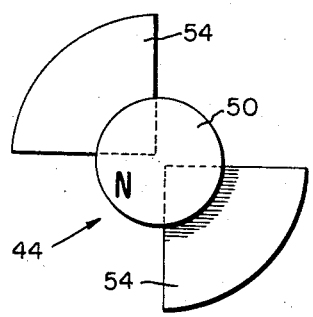
Figure 7:
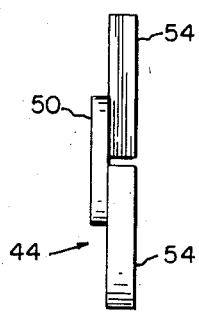
Figure 8:
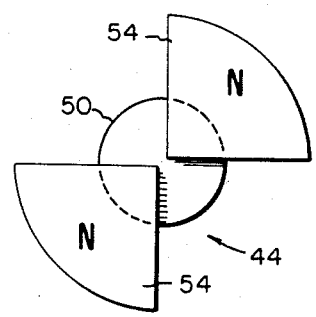
Figure 9:
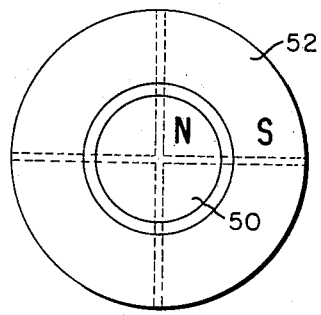
Figure 10:
Figure 11:
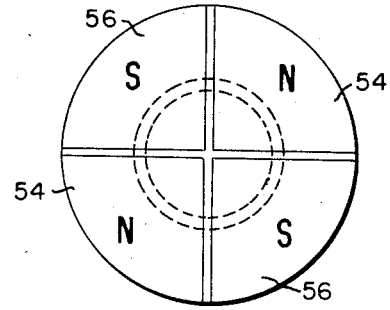

Fig. 2 is a view of the front face of the magnetic driver showing the work engaging jaws in adjusted position to accommodate an intermediate size of work piece, and Figs. 3–11, inclusive, are views showing in somewhat schematic fashion the construction of the adapter plate on which the work engaging jaws of the driver are mounted and by which the flux from the chuck is transmitted to the jaws. Figs. 3, 6 and 9 are views of the rear or chuck-contacting face of the outer element, the inner element, and the assembled adapter, respectively. Figs. 4, 7 and 10 are side views of said respective parts, and Figs. 5, 8 and 11 are front views of said parts.

The magnetic driver of the invention is particularly designed for the supporting and driving of thin walled annular work pieces such as indicated in outline at 16 in Fig. 1. In this view, the workpiece is being internally ground by abrasive wheel 18 while being rotated about a center which is very slightly displaced from the axis of the magnetic chuck 20. Such displacement of the work piece results from one or more shoes (not illustrated) which bear against the periphery of the work piece and support the same against the grinding wheel. This mode of grinding is well known in the art and requires no detailed showing or description.

The magnetic chuck is illustrated as being of the electromagnetic type of conventional configuration, having its winding 21 disposed about the central element of an E-shaped core to provide concentric inner and outer pole faces at the end of the chuck. For convenience in identifying the flux paths in the adapter plate to be described, the center pole 22 of the chuck will be called the north pole while the outer or annular pole will be termed the south pole. Leads 26 extend to the usual slip rings (not shown) by which power is supplied to the winding to energize the chuck.

The magnetic driver assembly comprises the adapter plate or support 30 and the work-engaging jaws 32. The adapter plate, hereinafter described in detail, is mounted on the work holding face of the magnetic chuck 20, and is provided with flux-conductive portions which register with the pole faces of the chuck. The work holding jaws 32 are mounted on the front face of the adapter plate, the internal construction of the plate being such that adjacent jaws are in flux communication with unlike poles of the chuck 20 so that when the chuck is On, the flux is concentrated across the gaps between adjacent jaws.

To support the work piece accurately by its side edge as shown in Fig. 1, the jaws 32 are provided with arcuate shoulders 34. These shoulders may advantageously be somewhat narrower in their radial dimension than the wall thickness of the work piece 16, so as to insure that the shoulders are subjected to uniform wear as a result of the slight shifting that takes place due to the eccentric positioning of the work piece relative to the axis of rotation of the chuck.

As has already been indicated, a feature of the invention is the provision of means by which the relatively narrow work engaging shoulders may be made to accommodate work pieces of various diameters. This is accomplished by mounting the work holding members 32 so as to permit radial adjustment. To this end, the front face of the adapter plate 30 is provided with T-shaped slots or dovetailed guideways 38 to receive clamping members 40. The arcuate elements 32 are secured in adjusted position by tightening the clamp screws 42. While the radius of the arcuate shoulder 34 may not exactly coincide with the radius of the particular work piece, a considerable range of diameters may be accommodated due to the fact that the driving force is provided by magnetic attraction, which does not require exact correspondence between shoulder and work.

To accommodate a wide range of work piece diameters, it is convenient to provide additional sets of jaw elements having their shoulder portions of different radii. Thus, segments having their outer radius substantially that the adapter plate might have the arcuate work-engaging shoulder disposed close to the outer edge of the segments, while for very small diameter work, small-radius segments would be employed with the arcuate shoulder close to the inner radius of the segments. Substitution of one set of segments or jaws for another set merely requires loosening of the screws 42 after which the jaws can be slid out and another set substituted.

The adapter plate 30 on which the jaws 32 are mounted is arranged to provide flux communication between the poles of the chuck 20 and the work engaging shoulders 34. To accomplish this, the adapter plate 30 is made up of flux-conductive elements which have the general configuration illustrated in Figs. 3–11. While details of the actual fabrication may vary somewhat, in general the adapter plate may be considered to involve a two-part construction embodying a north element 44 and a south element 46. These elements are so termed because of the fact that the rear face of the adapter plate 30, that face which engages the work holding face of the chuck 20, is divided into inner and outer concentric regions which register with the inner and outer (north and south) poles of the chuck. The center pole of the adapter plate is indicated at 50 in Figs. 6 and 7 while the outer or annular pole surface is indicated at 52 in Figs. 3 and 4, and the parts in assembled relation are shown in Fig. 9.

To form the front face of the adapter plate, the elements 44 and 46 are provided with sectors formed integrally or by attachment, as shown in Figs. 5 and 8. In flux communication with the center pole 50 are the sectors 54, likewise of north polarity for purposes of illustration, while sectors 56 communicate with the portion 52 constituting the outer pole piece. It will be observed that when the parts are assembled as shown in Figs. 10 and 11, a plane circular configuration results in which unlike polarities are adjacent. While the work supporting jaws are mounted on these sectors for flux communication with the poles of the chuck, the T-shaped slots for securing the jaws have been omitted from the views of Figs. 10 and 11 for the sake of clarity. It will also be observed that the views Figs. 3–11 have been rotated 45 degrees from the position of the parts shown in Figs. 1 and 2 for better illustration of the construction and relationship of the parts. In these views, the non-magnetic spacer or filler material has been omitted, but it will be understood that the gaps between the elements 44 and 46 will be filled with suitable spacer material such as type metal to enable the parts to be secured in a structural unit.

It will be understood that the invention has been described and illustrated in terms of a preferred embodiment wherein the adapter plate has a configuration to permit its use with a chuck having its work holding surface arranged in inner and outer concentric poles. As an important feature of the invention consists in the provision of adjustable and replaceable work holding elements wherein the work holding flux may be concentrated across the gaps between adjacent elements, it will be appreciated that the invention is not limited to the particular configuration of chuck and pole pieces thereof, except as limited by the appended claims. The invention provides an advantageous means for supporting thin-walled annular work pieces for centerless-type operations while allowing convenient adjustment or substitution of parts to accommodate a wide range of work diameters.

I claim as my invention:

1. A magnetic driver for thin-walled annular work pieces comprising a support adapted to be mounted on the end face of a rotatable magnetic chuck, said support comprising flux-conductive elements having rear surfaces adapted to contact the pole faces of the magnetic chuck, said elements being arranged in magnetically discrete zones at the front of the support, adjacent zones being in flux communication with unlike poles of the chuck, and work-supporting members mounted on the elements in flux communication therewith and in radially adjustable circumferentially spaced relation, said members having arcuate shoulders to engage and support the side edge of the work piece.

2. A magnetic driver for thin-walled annular work pieces comprising a support having a circular configuration and front and rear faces and adapted to be mounted on the end face of a rotatable magnetic chuck having pole faces of unlike magnetic polarity, the support comprising flux-conductive elements having rear surfaces adapted to register with the pole faces of the chuck, said flux conductive elements being disposed in spaced sectors at the front face of the support, adjacent sectors being in flux communication with unlike poles of the chuck, and a plurality of arcuate segments, means for mounting said segments on the sectors in radially adjustable circumferentially spaced relation comprising guideways and clamping members within said guideways, said arcuate segments having axially projecting arcuate shoulders to engage and support the side edge of the work piece.

3. A magnetic driver for thin-walled annular work pieces comprising a support having a circular configuration and front and rear faces and adapted to be mounted on the end face of a rotatable magnetic chuck having concentric pole faces of unlike magnetic polarity, the support comprising flux-conductive elements having rear surfaces adapted to register with the concentric rear surfaces of the chuck, said flux conductive elements being disposed in spaced sectors at the front face of the support, adjacent sectors being in flux communication with unlike poles of the chuck, and a plurality of arcuate segments, means for mounting said segments on the sectors in radially adjustable circumferentially spaced relation comprising guideways and clamping members within said guideways, said arcuate segments having axially projecting arcuate shoulders to engage and support the side edge of the work piece.

References Cited in the file of this patent

UNITED STATES PATENTS

| | | |
|---|---|---|
| 2,479,584 | Meyer | Aug. 23, 1949 |
| 2,769,642 | Berry | Nov. 6, 1956 |
| 2,812,185 | Snell | Nov. 5, 1957 |